United States Patent
Kojima et al.

(10) Patent No.: US 12,134,745 B2
(45) Date of Patent: *Nov. 5, 2024

(54) OIL COMPOUND FOR SILICONE-BASED DEFOAMING AGENTS, METHOD FOR PRODUCING SAME, AND DEFOAMING AGENT CONTAINING OIL COMPOUND FOR SILICONE-BASED DEFOAMING AGENTS

(71) Applicant: DOW TORAY CO., LTD., Tokyo (JP)

(72) Inventors: Kazuhiko Kojima, Ichihara (JP); Ikutaro Morikawa, Ichihara (JP); Tsunehito Sugiura, Ichihara (JP); Takeshi Yoshizawa, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/269,824

(22) PCT Filed: Dec. 23, 2021

(86) PCT No.: PCT/JP2021/047962
§ 371 (c)(1),
(2) Date: Jun. 27, 2023

(87) PCT Pub. No.: WO2022/145345
PCT Pub. Date: Jul. 7, 2022

(65) Prior Publication Data
US 2024/0093119 A1    Mar. 21, 2024

(30) Foreign Application Priority Data
Dec. 28, 2020 (JP) .................. 2020-219095

(51) Int. Cl.
| | | |
|---|---|---|
| *C10M 161/00* | (2006.01) | |
| *B01D 19/04* | (2006.01) | |
| *C10M 125/26* | (2006.01) | |
| *C10M 155/02* | (2006.01) | |
| *C10M 173/02* | (2006.01) | |
| *C10N 30/02* | (2006.01) | |
| *C10N 30/18* | (2006.01) | |
| *C10N 40/20* | (2006.01) | |
| *C10N 50/00* | (2006.01) | |

(52) U.S. Cl.
CPC ....... *C10M 161/00* (2013.01); *B01D 19/0409* (2013.01); *C10M 125/26* (2013.01); *C10M 155/02* (2013.01); *C10M 173/02* (2013.01); *C10M 2201/105* (2013.01); *C10M 2229/041* (2013.01); *C10M 2229/047* (2013.01); *C10N 2030/02* (2013.01); *C10N 2030/18* (2013.01); *C10N 2040/20* (2013.01); *C10N 2050/011* (2020.05)

(58) Field of Classification Search
CPC .............. C10M 161/00; C10M 125/26; C10M 155/02; C10M 173/02; C10M 2201/105; C10M 2229/041; C10M 2229/047; B01D 19/0409; C10N 2030/02; C10N 2030/18; C10N 2040/20; C10N 2050/011
See application file for complete search history.

(56) References Cited

U.S. PATENT DOCUMENTS

| | | | |
|---|---|---|---|
| 4,919,843 A | 4/1990 | Innertsberger et al. | |
| 5,283,004 A | 2/1994 | Miura | |
| 2003/0013808 A1 | 1/2003 | Tonge et al. | |
| 2011/0021688 A1* | 1/2011 | Herzig ................... | D21H 21/12 528/25 |
| 2011/0294714 A1* | 12/2011 | Delbrassinne ......... | C11D 3/373 510/343 |
| 2015/0119509 A1* | 4/2015 | Brehm ............... | B01D 19/0409 524/506 |
| 2015/0240424 A1 | 8/2015 | Chao et al. | |

(Continued)

FOREIGN PATENT DOCUMENTS

| | | |
|---|---|---|
| CA | 2139057 A1 | 6/1995 |
| EP | 2325262 A1 | 5/2011 |

(Continued)

OTHER PUBLICATIONS

English translation of International Search Report for PCT/JP2021/047962 dated Mar. 15, 2022, 2 pages.

(Continued)

*Primary Examiner* — Ellen M McAvoy
(74) *Attorney, Agent, or Firm* — Warner Norcross + Judd LLP

(57) ABSTRACT

Provided is a silicone based anti-foaming agent oil compound that has not only superior anti-foaming speed but also anti-foaming performance that does not degrade with repeated use or use over a long period. The silicone based anti-foaming agent oil compound comprises: (A) an essentially hydrophobic organopolysiloxane with a viscosity at 25° C. of 2,500 to 50,000 mPa·s: 20 to 80 parts by mass; (B) a hydrophobic organopolysiloxane or cyclic organopolysiloxane having silanol groups at least at both terminals: 20 to 80 parts by mass; (C) a silane or silane condensation product: 1 to 10 parts by mass; and (D) a fine powder silica with a specific surface area of 50 m²/g or more: 2 to 10 parts by mass; where the total amount of (A) and (B) combined is 100 parts by mass. Also provided is a method for manufacturing the silicone based anti-foaming agent oil compound.

13 Claims, No Drawings

(56) References Cited

U.S. PATENT DOCUMENTS

| | | | | |
|---|---|---|---|---|
| 2017/0087483 A1* | 3/2017 | Mitra | ................. | C08L 83/14 |
| 2017/0209813 A1* | 7/2017 | Kobayashi | ............. | C08G 77/18 |
| 2019/0224591 A1* | 7/2019 | Brehm | ................. | D21C 3/28 |
| 2022/0001301 A1* | 1/2022 | Grandl | ................. | C11D 3/373 |
| 2023/0037257 A1* | 2/2023 | Chao | ................. | C08G 77/20 |

FOREIGN PATENT DOCUMENTS

| | | |
|---|---|---|
| JP | S63147507 A | 6/1988 |
| JP | S6443312 A | 2/1989 |
| JP | H7185212 A | 7/1995 |
| JP | 2011104525 A | 6/2011 |
| JP | 2014077218 A | 5/2014 |
| JP | 2015085312 A | 5/2015 |
| WO | 2006063234 A1 | 6/2006 |

OTHER PUBLICATIONS

English translation of International Search Report for PCT/JP2021/047974 dated Mar. 1, 2022, 2 pages.

Machine assisted English translation of JP2015085312A obtained from https://worldwide.espacenet.com/patent on Jun. 23, 2023, 18 pages.

Machine assisted English translation of JPS63147507A obtained from https://worldwide.espacenet.com/patent on Jun. 23, 2023, 7 pages.

* cited by examiner

OIL COMPOUND FOR SILICONE-BASED DEFOAMING AGENTS, METHOD FOR PRODUCING SAME, AND DEFOAMING AGENT CONTAINING OIL COMPOUND FOR SILICONE-BASED DEFOAMING AGENTS

CROSS-REFERENCE TO RELATED APPLICATIONS

This application is the U.S. National Stage of PCT/JP2021/047962 filed on 23 Dec. 2021, which claims priority to Japanese Patent Application No. 2020-219095 filed on 28 Dec. 2020, the content of which is incorporated herein by reference.

TECHNICAL FIELD

The present invention relates to a silicone based anti-foaming agent oil compound, method for manufacturing the same, and an anti-foaming agent containing the silicone based anti-foaming agent oil compound.

BACKGROUND ART

Anti-foaming agents are used in industrial processes, such as processes for treating or processing liquids, in order to suppress the formation of foam. In particular, silicone-based anti-foaming agents are generally used because they are chemically stable and have low influence on the object to which they are applied.

Various types of silicone anti-foaming agents have been proposed. For example, Patent Document 1 describes a silicone antifoam composition containing a polyorganosiloxane having a specific general formula and having a viscosity of 20 cs to 100,000 cs at 25° C., a silane, and a finely powdered filler. In addition, Patent Document 2 discloses an essentially hydrophobic organopolysiloxane having a viscosity of 10 to 100,000 mm$^2$/s at 25° C., fine powder silica having a specific surface area, and anti-foaming agent compounds containing trifunctional hydrolyzable silanes and/or partial hydrolytic condensates thereof expressed by a specific general formula. Furthermore, Patent Document 3 discloses a method for manufacturing an oil compound for an anti-foaming agent where an essentially hydrophobic organopolysiloxane having a viscosity of 10 to 100,000 mm$^2$/s at 25° C. and fine powder silica are mixed with an alkaline catalyst composed of an alkali metal or alkaline earth metal oxide, hydroxide, alkoxide, or siliconate, and then neutralized with a solid acid.

However, conventional anti-foaming agents have a slow anti-foaming speed and sometimes early anti-foaming performance is insufficient. In addition, the anti-foaming performance may deteriorate when used repeatedly or for a relatively long period of time. Therefore, development of an anti-foaming agent having fast anti-foaming speed and superior anti-foaming retention where anti-foaming performance is not reduced even with repeated use is desirable.

RELATED ART DOCUMENTS

Patent Documents

Patent Document 1: Japanese Unexamined Patent Application S63-147507
Patent Document 2: Japanese Unexamined Patent Application 2015-85312
Patent Document 3: Japanese Unexamined Patent Application 2011-104525

SUMMARY OF THE INVENTION

Problem to be Solved by the Invention

In order to resolve the problems of the conventional technology described above, an object of the present invention is to provide a silicone based anti-foaming agent oil compound and a manufacturing method thereof for an anti-foaming agent that not only has superior anti-foaming speed but also where anti-foaming performance is not reduced even when used repeatedly or over a long period.

Means for Solving the Problem

As a result of conducting diligent research on the problem described above, the present inventors arrived at the present invention. In other words, an object of the present invention is achieved by a silicone based anti-foaming agent oil compound, containing:
  (A) an essentially hydrophobic organopolysiloxane having a viscosity of 2,500 to 50,000 mPa·s at 25° C.: 20 to 80 parts by mass;
  (B) a hydrophobic organopolysiloxane or a cyclic organopolysiloxane containing silanol groups at least at both terminals: 20 to 80 parts by mass;
  (C) silane or silane condensation product: 1 to 10 parts by mass; and
  (D) fine powder silica with a specific surface area of 50 m$^2$/g or more: 2 to 10 parts by mass, where
  the total amount of (A) and (B) is 100 parts by mass.
  Component (B) preferably includes:
  (B1) a hydrophobic organopolysiloxane containing silanol groups at both terminals and having a viscosity of 1000 to 10,000,000 mPa·s; and
  (B2) a hydrophobic organopolysiloxane or cyclic siloxane containing silanol groups at both terminals and having a viscosity of 1 to 1000 mPa·s.
  The molar ratio of component (B) relative to the total amount of component (A) and component (B) is 0.7 or more.
  The molar ratio of component (B1) relative to the total amount of component (A) and component (B1) is 0.2 or more.
  The silicone based anti-foaming agent oil compound preferably has a viscosity of 10,000 to 1,000,000 mPa·s at 25° C.
  The present invention is also related to a method of manufacturing the silicone based anti-foaming agent oil compound, including:
  (1) a step of kneading all or some of the components of the silicone based anti-foaming agent oil compound of the present invention;
  (2) a step of heat-treating the kneaded material obtained in the step (1) at 50 to 300° C.;
  (3) a step of adding an alkali catalyst or an acid catalyst to the kneaded product obtained in the step (2), and kneading;
  (4) a step of adding, if present, the remaining components of the silicone based anti-foaming agent oil compound of the present invention to the kneaded material obtained in the step (3), and kneading; and
  (5) a step of neutralizing the catalyst in the kneaded product obtained in step (4).

The present invention also relates to an anti-foaming agent containing the silicone based anti-foaming agent oil compound of the present invention.

The anti-foaming agent of the present invention is preferably an emulsion.

In the anti-foaming agent of the present invention the silicone based anti-foaming agent oil compound of the present invention is preferably emulsified with a polyorganosiloxane polymer crosslinked product having a polyoxyalkylene group.

The polyorganosiloxane polymer crosslinked product containing a polyoxyalkylene group preferably includes:

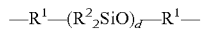   moiety structure (1)

(where $R^1$ represents an alkylene group having 2 to 20 carbon atoms bonded to a silicon atom on the polysiloxane chain, $R^2$ represents a monovalent hydrocarbon group, and d is a number in the range of 100 to 1000), and

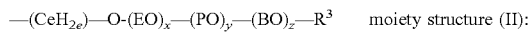   moiety structure (II):

(where
EO represents an ethyleneoxy unit expressed by $C_2H_4O$,
PO represents a propyleneoxy unit expressed by $C_3H_6O$,
BO represents a butyleneoxy unit expressed by $C_4H_8O$, and the single bond on the left
end is bonded to a silicon atom on the polysiloxane chain,
$R^3$ represents a hydrogen atom, an alkyl group, an aryl group or an acyl group,
e is a number ranging from 2 to 10,
x+y+z is a number ranging from 30 to 100,
x is a number ranging from 15 to 50,
y is a number ranging from 15 to 50, and
z is a number ranging from 0 to 50).

The particle diameter of the anti-foaming agent of the present invention is preferably 0.1 to 10 μm.

The anti-foaming agent of the present invention is preferably used in metalworking oils.

Effect of the Invention

With the silicone based anti-foaming agent oil compound of the present invention, superior anti-foaming speed is achieved in an anti-foaming agent having not only superior early anti-foaming performance, but also, anti-foaming performance that is not significantly reduced even with repeated or long term use.

DESCRIPTION OF THE PREFERRED EMBODIMENTS

The silicone based anti-foaming agent oil compound of the present invention includes:
(A) an essentially hydrophobic organopolysiloxane having a viscosity of 2,500 to 50,000 mPa·s at 25° C.: 20 to 80 parts by mass;
(B) a hydrophobic organopolysiloxane or a cyclic organopolysiloxane containing silanol groups at least at both terminals: 20 to 80 parts by mass;
(C) silane or silane condensation product: 1 to 10 parts by mass; and
(D) fine powder silica having a specific surface area of 50 m²/g or more: 2 to 10 parts by mass; wherein the total amount of (A) and (B) is 100 parts by mass.

Each component contained in the silicone based anti-foaming agent oil compound of the present invention will be described below.

[Essentially hydrophobic organopolysiloxane with a viscosity of 2,500 to 50,000 mPa·s at 25° C.]

The organopolysiloxane of component (A) is one of the characteristic components of the present invention, has a specific viscosity range, and is essentially hydrophobic. Here, essentially hydrophobic means that the organopolysiloxane as a whole exhibits hydrophobicity even if some functional groups contain hydrophilic groups.

The essentially hydrophobic organopolysiloxane (A) may be either straight chain or branched, but is preferably expressed by the following average composition formula (I).

   (I)

In the above formula (I), $R^1$ represents one or more unsubstituted or substituted monovalent hydrocarbon groups having 1 to 18 carbon atoms, especially 1 to 15 carbon atoms, which may be the same or different. Specific examples of monovalent hydrocarbon groups for $R^1$ include a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, hexadecyl group, octadecyl group, and other alkyl groups, a cyclohexyl group and other cycloalkyl groups, a vinyl group, allyl group, and other alkenyl groups, a phenyl group, tolyl group, and other aryl groups, a styryl group, α-methylstyryl groups, and other aralkyl groups, or a chloromethyl group, 3-chloropropyl group, 3,3,3-trifluoropropyl group, cyanoethyl group, 3-aminopropyl group, N—(β-aminoethyl)-γ-aminopropyl group, and the like in which a part or all of the hydrogen atoms bonded to the carbon atoms of these groups are substituted with a halogen atom, cyano group, amino group, hydroxyl group, or the like; and from the perspective of anti-foaming and cost, 80 mol % or more, particularly 90 mol % or more, of all $R^1$ are preferably methyl groups.

g is a positive number where $1.9 \leq g \leq 2.2$ and preferably $1.95 \leq g \leq 2.15$.

The organopolysiloxane terminal may be capped with an organosilyl group expressed by $R^1_3Si$ or may be capped with a diorganohydroxysilyl group expressed by $(HO)R^1_2Si$.

(A) The viscosity at 25° C. of the essentially hydrophobic organopolysiloxane measured by a rotational viscometer must be within a specific range in terms of anti-foaming speed and retention of anti-foaming performance. Specifically, the range is 2,500 to 50,000 mPa·s, preferably 3,000 to 45,000 mPa·s, and more preferably 4,000 to 40,000 mPa·s. If less than the lower limit, anti-foaming performance will be inferior, and if above the upper limit, the viscosity of the silicone based anti-foaming agent oil compound increases, which may deteriorate workability.

Component (A) is typically produced by a ring-opening polymerization of a cyclic low molecular weight siloxane such as octamethylcyclotetrasiloxane using a catalyst, which is preferably distilled off under heating and reduced pressure while venting an inert gas during reaction formation.

Specific structures of component (A) include, but are not limited to, those shown below. Note that in the formulae, Me, Vi, and Ph represent methyl groups, vinyl groups, and phenyl groups, respectively.

[Formula 1]

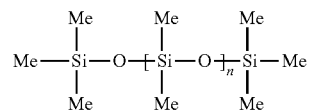

-continued

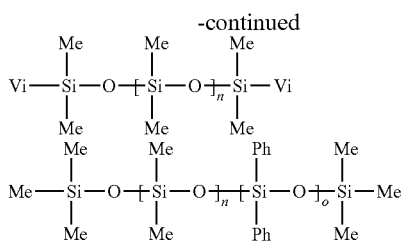

(In the formula, n≥10 and o≥1.)

Component (A) may be a single essentially hydrophobic organopolysiloxane having a viscosity of 2,500 to 50,000 mPa·s at 25° C., or two or more may be used in combination.

[Hydrophobic organopolysiloxane or cyclic organopolysiloxane containing silanol groups at least at both terminals]

The (B) component organopolysiloxane is hydrophobic or is cyclic and contains silanol groups at least at both terminals. Here, the term hydrophobicity means that the organopolysiloxane as a whole exhibits hydrophobicity even if some of the functional groups contain hydrophilic groups, as in the case of component (A).

The hydrophobic organopolysiloxane (B) containing silanol groups at least at both terminals may be straight chain or branched, but is suitably expressed by the following average composition formula (II).

$$R^2_p(R^3O)_q SiO_{(4-p-q)/2} \quad (II)$$

In formula (II) above, $R^2$ represents one or more unsubstituted or substituted monovalent hydrocarbon groups having 1 to 18 carbon atoms, especially 1 to 15 carbon atoms, which may be the same or different. Specific examples of monovalent hydrocarbon groups for $R^2$ include a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, hexadecyl group, octadecyl group, and other alkyl groups, a cyclohexyl group and other cycloalkyl groups, a vinyl group, allyl group, and other alkenyl groups, a phenyl group, tolyl group, and other aryl groups, a styryl group, α-methylstyryl groups, and other aralkyl groups, or a chloromethyl group, 3-chloropropyl group, 3,3,3-trifluoropropyl group, cyanoethyl group, 3-aminopropyl group, N—(β-aminoethyl)-γ-aminopropyl group, and the like in which a part or all of the hydrogen atoms bonded to the carbon atoms of these groups are substituted with a halogen atom, cyano group, amino group, hydroxyl group, or the like. $R^3$ represents one or more hydrogen atoms or monovalent hydrocarbon groups having 1 to 18 carbon atoms, especially 1 to 15 carbon atoms, which may be the same or different.

The average value of p+q is preferably 1.9 to 2.2, where q is a sufficient value to provide silanol groups at both terminals, and at least one OH group is present at each end.

The structure of the cyclic siloxane is not particularly limited, but examples thereof include those expressed by the following average composition formula (III).

[Formula 2]

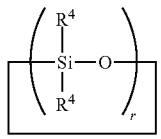

(III)

In formula (III) above, $R^4$ represents one or more unsubstituted or substituted monovalent hydrocarbon groups having 1 to 15 carbon atoms, especially 1 to 10 carbon atoms, which may be the same or different. Specific examples of monovalent hydrocarbon groups for $R^4$ include a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, and other alkyl groups, a cyclohexyl group and other cycloalkyl groups, a vinyl group, allyl group, and other alkenyl groups, a phenyl group, tolyl group, and other aryl groups, a styryl group, α-methylstyryl groups, and other aralkyl groups, or a chloromethyl group, 3-chloropropyl group, 3,3,3-trifluoropropyl group, cyanoethyl group, 3-aminopropyl group, N-(3-aminoethyl)-γ-aminopropyl group, and the like in which a part or all of the hydrogen atoms bonded to the carbon atoms of these groups are substituted with a halogen atom, cyano group, amino group, hydroxyl group, or the like.

r is preferably an integer of 3 to 20, more preferably an integer of 3 to 10.

In particular, component (B) preferably includes:
(B1) a hydrophobic organopolysiloxane containing silanol groups and having a viscosity of 1000 to 10,000,000 mPa·s; and
(B2) a hydrophobic organopolysiloxane or cyclic siloxane containing silanol groups at both terminals and having a viscosity of 1 to 1000 mPa·s.

The viscosity of (B1) hydrophobic organopolysiloxane containing silanol groups at both terminals at 25° C. measured using a rotational viscometer is preferably 2,000 to 1,000,000 mPa·s, more preferably 5,000 to 100,000 mPa·s. In addition, the viscosity of
(B2) hydrophobic organopolysiloxane containing silanol groups at both terminals at 25° C. measured using a rotational viscometer is preferably 5 to 500 mPa·s, more preferably 10 to 100 mPa·s.

Component (B) can be used in an amount of 20 to 80 parts by mass based on 20 to 80 parts by mass of component (A), where the total amount of components (A) and (B) is 100 parts by mass. Preferably, component (B) can be used in an amount of 30 to 70 parts by mass based on 30 to 70 parts by mass of component (A), where the total amount of components (A) and (B) is 100 parts by mass.

The molar ratio of component (B) to the total amount of component (A) and component (B) is 0.7 or more, preferably 0.75 or more, and more preferably 0.8 or more.

The molar ratio of component (B1) to the total amount of component (A) and component (B1) is 0.2 or more, preferably 0.25 or more, and more preferably 0.3 or more.

[Silane or Silane Condensation Product]

The structure of the component (C) silane or silane condensation product is not particularly limited, but examples thereof include those expressed by the following average composition formula (IV).

$$R^5_s SiX_{4-s} \quad (IV)$$

In formula (IV) above, $R^5$ represents one or more unsubstituted or substituted monovalent hydrocarbon groups having 1 to 15 carbon atoms, especially 1 to 10 carbon atoms, which may be the same or different. Specific examples of monovalent hydrocarbon groups for $R^5$ include a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, and other alkyl groups, a cyclohexyl group and other cycloalkyl groups, a vinyl group, allyl group, and other alkenyl groups, a phenyl group, tolyl group, and other aryl groups, a styryl group, α-methylstyryl groups, and other aralkyl groups, or a chloromethyl group, 3-chloropropyl group, 3,3,3-trifluoropropyl group, cyanoethyl group, 3-aminopropyl group, N-(3-aminoethyl)-γ-aminopropyl group, and the like in which a part or all of the hydrogen atoms bonded to the carbon atoms of these groups are substituted with a halogen atom, cyano group, amino group, hydroxyl group, or the like.

X represents a hydrolyzable group, for example —OR', —OYOR', —NR'R'', —ON=CR'R'', —OOCR', —OCR'=CR'R'', —ONR'R'', and —NR'—CO—R''. R' and R'' represent one or more hydrogen or monovalent hydrocarbon groups, and examples of monovalent hydrocarbon groups include the same groups as those for $R^5$. Y represents an unsubstituted or substituted divalent hydrocarbon group having 1 to 15 carbon atoms, especially 1 to 10 carbon atoms, such as an alkylene group. In addition, R' and R'' in —ON=CR'R'' may be joined to form the following structure.

[Formula 3]

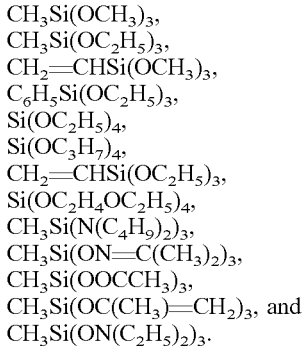

In the formula, Z represents an unsubstituted or substituted divalent hydrocarbon group having 1 to 15 carbon atoms, especially 1 to 10 carbon atoms, such as an alkylene group.

And the average value of s is 1 or less; meaning this is a single substance or mixture of $R^5SiX_3$ or $SiX_4$.

The silane of component (C) is a compound well known to a person of ordinary skill in the art, and examples thereof include the following compounds.

$CH_3Si(OCH_3)_3$,
$CH_3Si(OC_2H_5)_3$,
$CH_2=CHSi(OCH_3)_3$,
$C_6H_5Si(OC_2H_5)_3$,
$Si(OC_2H_5)_4$,
$Si(OC_3H_7)_4$,
$CH_2=CHSi(OC_2H_5)_3$,
$Si(OC_2H_4OC_2H_5)_4$,
$CH_3Si(N(C_4H_9)_2)_3$,
$CH_3Si(ON=C(CH_3)_2)_3$,
$CH_3Si(OOCCH_3)_3$,
$CH_3Si(OC(CH_3)=CH_2)_3$, and
$CH_3Si(ON(C_2H_5)_2)_3$.

The silane of component (C) may also be a partially hydrolyzed condensate thereof.

As the component (C), the above silanes or silane condensation products may be used alone, or two or more of them may be used in combination.

Component (C) can be used in an amount of 1 to 10 parts by mass, preferably 2 to 5 parts by mass, relative to a combined 100 parts by mass of components (A) and (B).

[Fine powder silica having a specific surface area of 50 $m^2/g$ or more]

Fine powder silica as component (D), is desirably a hydrophilic silica such as fumed silica or precipitated silica, and these may be used alone or in combination of two or more. In addition, the specific surface area (BET method) of fine powder silica is 50 $m^2/g$ or more, preferably 100 to 700 $m^2/g$, and more preferably 150 to 500 $m^2/g$. By setting the specific surface area to 50 $m^2/g$ or more, preferable anti-foaming performance can be obtained.

Examples of the commercially available component (D) that can be used in the present invention include: AEROSIL (registered trademark) 300 (hydrophilic fumed silica having a BET specific surface area of 300 $m^2/g$), AEROSIL (registered trademark) 200 (hydrophilic fumed silica having a BET specific surface area of 200 $m^2/g$) available from Nippon Aerosil Co. Ltd., and NIPSIL (registered trademark) L-250 (hydrophilic precipitated silica having a BET specific surface area of 170 $m^2/g$) available from TOSOH SILICA CORPORATION.

The proportion of component (D) is 2 to 10 parts by mass, preferably 3 to 5 parts by mass, relative to a combined 100 parts by mass of components (A) and (B). If the proportion is less than 2 parts by mass, sufficient anti-foaming performance cannot be obtained, and if the proportion exceeds 10 parts by mass, the resulting silicone based anti-foaming agent oil compound will have an increased viscosity and poor workability.

[Manufacturing Method of Silicone Based Anti-Foaming Agent Oil Compound]

In one embodiment, the present invention is related to a method of manufacturing the silicone based anti-foaming agent oil compound, including:

(1) a step of kneading all or part of the components of the silicone based anti-foaming agent oil compound of the present invention;

(2) a step of heat-treating the kneaded material obtained in the step (1) at 50 to 300° C.;

(3) a step of adding an alkali catalyst or an acid catalyst to the kneaded product obtained in the step (2), and kneading;

(4) a step of adding, if present, the remaining components of the silicone based anti-foaming agent oil compound of the present invention to the kneaded material obtained in the step (3), and kneading; and (5) a step of neutralizing the catalyst in the kneaded product obtained in step (4).

The alkali catalyst or acid catalyst used in step (3) in the method for manufacturing a silicone based anti-foaming agent oil compound of the present invention is not particularly limited. An oxide, hydroxide, alkoxide, or silanolate of an alkali metal or alkaline earth metal that is a well-known alkali catalyst used for an equilibrium reaction of a polysiloxane can be used as the alkali catalyst and preferred examples include potassium silanolate and potassium hydroxide. In addition, examples of acid catalysts include: organic acids such as acetic acid, butyric acid, maleic acid, and citric acid, and inorganic acids such as hydrochloric acid, nitric acid, phosphoric acid and sulfuric acid. The catalyst is more preferably an alkali catalyst rather than an acid catalyst.

The amount of alkali catalyst or acid catalyst used is 0.001 to 5 parts by mass per 100 parts by mass of component (A), preferably 0.01 to 5 parts by mass, more preferably 0.01 to 3 parts by mass, and even more preferably 0.05 to 3 parts by mass. If the amount is less than 0.001 parts by mass, a sufficient catalytic effect cannot be obtained, and if the amount exceeds 5 parts by mass, the effect of the catalyst will not be greatly improved, and will be disadvantageous in terms of cost.

Regarding neutralizing agents used in step (5) of the method for manufacturing the silicone based anti-foaming agent oil compound of the present invention, examples of neutralizing agents for an alkali catalyst include: hydrochloric acid, sulfuric acid, nitric acid, phosphoric acid, acetic acid, and carboxylic acid that is in a solid state at room temperature and carboxylic acid that is in a solid state at room temperature is preferable. Examples of carboxylic acids that are solid at room temperature include: monocarboxylic acids such as benzoic acid; dicarboxylic acids such as oxalic acid, malonic acid, succinic acid, glutaric acid, adipic acid, phthalic acid, isophthalic acid, and terephthalic acid; or tricarboxylic acids such as citric acid, isocitric acid, oxalosuccinic acid, and aconitic acid. Of these, succinic acid, which has a small acid dissociation constant, is strong as an acid, and is easy to obtain, is preferable. Examples of a neutralizing agent for the acid catalyst include: alkali metal or alkaline earth metal oxides, hydroxides, alkoxides, or silanolates, while potassium silanolate and potassium hydroxide are preferred. Note, the amount of the neutralizing agent to be used may be any amount that can neutralize the alkali catalyst or acid catalyst described above.

In step (1) in the method for manufacturing the silicone based anti-foaming agent oil compound of the present invention, kneading is performed at a temperature of components (A) to (C) or components (A) to (D) of preferably 100° C. or less, more preferably 80° C. or less. No particular external heating is required, kneading can be performed at room temperature (for example, 10 to 30° C.), and the temperature risen due to heat generation in the system due to frictional resistance generated during kneading is preferably maintained at 100° C. or less, more preferably at 80° C. or less. The processing time of this step (1) depends greatly on the kneading device and scale, and cannot be defined unconditionally and typically is 0.1 to 3 hours while roughly 0.5 to 2 hours is desirable.

In the step (2) in the method for manufacturing a silicone based anti-foaming agent oil compound of the present invention, the kneaded product obtained in the step (1) is heat treated at 50 to 300° C., preferably 70 to 200° C., and preferably while kneading. By setting the heat treatment temperature within the above range, superior anti-foaming performance can be obtained. The processing time of this step (2) depends greatly on the kneading device and scale, and cannot be defined unconditionally and typically is 0.1 to 4 hours while roughly 0.5 to 2 hours is desirable.

Step (3) in the method for manufacturing a silicone based anti-foaming agent oil compound of the present invention is adding an alkali catalyst or an acid catalyst to the kneaded product obtained in the step (2) and kneading to form an oil compound and make the system alkaline or acidic. (3) The process can be performed at 10 to 300° C., preferably 20 to 200° C. The processing time of this step (3) also depends greatly on the kneading device and scale, and cannot be defined unconditionally and typically is 0.05 to 3 hours while roughly 0.1 to 2 hours is desirable.

Step (4) in the method for manufacturing a silicone based anti-foaming agent oil compound of the present invention, is a step where any remaining components of the silicone based anti-foaming agent oil compound, for example, a part of component (B) or component (D), if present, are added to the kneaded product obtained in step (3) and then kneaded, and then the reactive groups of each component are solidified on the fine powder silica surface. (4) The process can be performed at 50-300° C., preferably 70 to 200° C. The processing time of this step (4) also depends greatly on the kneading device and scale, and cannot be defined unconditionally and typically is 0.05 to 6 hours while roughly 0.1 to 4 hours is desirable.

Step (5) in the method for manufacturing a silicone based anti-foaming agent oil compound of the present invention is a step of neutralizing the catalyst in the kneaded product obtained in the step (4) at 10 to 300° C., preferably at 20 to 200° C. The processing time of this step (3) [sic] also depends greatly on the kneading device and scale, and cannot be defined unconditionally and typically is 0.1 to 4 hours while roughly 0.5 to 3 hours is desirable.

In the method for manufacturing of the present invention, examples of the kneader used for kneading include: a planetary mixer, a kneader, a pressure kneader, a twin-screw kneader, an intensive mixer, an agitation homo mixer, a dispersion mixer, a planetary dispersion mixer, and the like, but is not particularly limited. These kneading machines can be used in any of steps (1) to (5).

The silicone based anti-foaming agent oil compound obtained by kneading and heat-treating the components described above can be used as-is, or can be used as an anti-foaming agent containing the silicone anti-foaming oil compound, specifically, a solution type anti-foaming agent dispersed in an appropriate solvent, a self-emulsifying anti-foaming agent using a polyorganosiloxane polymer cross-linked product with a polyoxyalkylene group, or an emulsion-type anti-foaming agent obtained using a well-known emulsification technique.

Here, the silicone based anti-foaming agent oil compound finally obtained has a viscosity at 25° C. measured using a rotational viscometer of 10,000 to 1,000,000 mPa·s, preferably 20,000 to 100,000 mPa·s, and more preferably 30,000 to 50,000 mPa·s. The viscosity of the anti-foaming agent obtained by dispersing or emulsifying the oil compound described above in a solvent may be appropriately designed by means of the dosage form, emulsification conditions, concentration, and the like.

Here, when a solution-type anti-foaming agent dispersed in an appropriate solvent is used, the solvent may be a solvent in which the essentially hydrophobic organopolysiloxane (A) is soluble, such as toluene, xylene, hexane, chloroform, 2-butanone, 4-methyl-2-pentanone, and the like.

When used as a solution type anti-foaming agent, the content of the silicone based anti-foaming agent oil compound is preferably 5 to 80% by mass, more preferably 30 to 70% by mass, based on the total amount of the anti-foaming agent. If the content of the silicone based anti-foaming agent oil compound is too small, the anti-foaming performance as an anti-foaming agent may be inferior, and if the content is too high, increasing the dispersibility of the silicone based anti-foaming agent oil compound, which is the main purpose of the solution type anti-foaming agent, may not be satisfied.

When used as a self-emulsifying anti-foaming agent or an emulsion-type anti-foaming agent, the polyorganosiloxane polymer crosslinked product containing a polyoxyalkylene group includes:

  moiety structure (1)

(where $R^1$ represents an alkylene group having 2 to 20 carbon atoms bonded to a silicon atom on the polysiloxane chain, $R^2$ represents a monovalent hydrocarbon group, and d is a number in the range of 100 to 1000), and

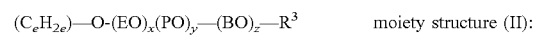  moiety structure (II):

(where
EO represents an ethyleneoxy unit expressed by $C_2H_4O$,
PO represents a propyleneoxy unit expressed by $C_3H_6O$,
BO represents a butyleneoxy unit expressed by $C_4H_8O$,
and the single bond on the left end is bonded to a silicon atom on the polysiloxane chain, R³ represents a hydrogen atom, an alkyl group, an aryl group or an acyl group,
e is a number ranging from 2 to 10,
x+y+z is a number ranging from 40 to 100,
x is a number ranging from 15 to 50,
y is a number ranging from 15 to 50, and
z is a number ranging from 0 to 50).

In moiety structure (I), $R^1$ represents an alkylene group having 2 to 20 carbon atoms bonded to a silicon atom on the polysiloxane chain. The alkylene group having 2 to 20 carbon atoms may be straight chain or branched chain, and examples include: a methylmethylene group, ethylene group, methylethylene group, propylene group, butylene group, pentylene group, hexylene group, heptylene group, and octylene group.

In moiety structure (1), $R^2$ represents a monovalent hydrocarbon group. $R^2$ represents one or more unsubstituted or substituted monovalent hydrocarbon groups having 1 to 18 carbon atoms, especially 1 to 15 carbon atoms, which may be the same or different. Specific examples of monovalent hydrocarbon groups for $R^2$ include a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, hexadecyl group, octadecyl group, and other alkyl groups, a cyclohexyl group and other cycloalkyl groups, a vinyl group, allyl group, and other alkenyl groups, a phenyl group, tolyl group, and other aryl groups, a styryl group, α-methylstyryl groups, and other aralkyl groups, or a chloromethyl group, 3-chloropropyl group, 3,3,3-trifluoropropyl group, cyanoethyl group, 3-aminopropyl group, N-(3-aminoethyl)-γ-aminopropyl group, and the like in which a part or all of the hydrogen atoms bonded to the carbon atoms of these groups are substituted with a halogen atom, cyano group, amino group, hydroxyl group, or the like.

In moiety structure (I), d is a number in the range of 100 to 1000, preferably in the range of 150 to 1000, more preferably in the range of 200 to 1000, particularly preferably in the range of 250 to 900 or in the range of 270 to 800.

Moiety structure (II) expresses a polyoxyalkylene group bonded to a silicon atom via an alkylene group having e carbon atoms, necessarily containing a certain number of ethyleneoxy units and a certain number of propyleneoxy units, and optionally further containing a butyleneoxy unit. More specifically, in the moiety structure (II), EO represents an ethyleneoxy unit expressed by $C_2H_4O$, and preferably an ethyleneoxy unit expressed by $CH_2CH_2O$. PO represents a propyleneoxy unit expressed by $C_3H_6O$, and may preferably be either a propyleneoxy unit expressed by $CH_2CH(CH_3)O$ or $CH_2CH_2CH_2O$. BO represents a butyleneoxy unit expressed by $C_4H_8O$, and similar to the propyleneoxy unit, BO may have either a straight chain or branched butylene structure. $R^3$ represents a hydrogen atom, an alkyl group, an aryl group or an acyl group. The alkyl group may be an unsubstituted or substituted alkyl group having 1 to 18 carbon atoms, especially 1 to 15 carbon atoms, and examples include: a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, hexadecyl group, and octadecyl group. The aryl group may be an aryl group having 6 to 20 carbon atoms and examples include: a phenyl group and tolyl group. The acyl group may be an acyl group having 2 to 12 carbon atoms and examples include: an acetyl group, propionyl group, and benzoyl group.

In moiety structure (II), e is a number in the range of 2-10, preferably in the range of 3 to 8. Note that an alkylene group having e carbon atoms, preferably an alkylene group having 3 to 8 carbon atoms, expressed by $C_eH_{2e}$ may have a partially branched structure or a straight chain structure.

In moiety structure (II), x+y+z is a number in the range of 30 to 100, more preferably in the range of 35 to 100, and particularly preferably in the range of 40 to 100. x is a number in the range 15 to 50, y is a number in the range 15 to 50, and z is a number in the range 0 to 50. x is preferably a number in the range of 18 to 45, more preferably a number in the range of 20 to 45. y is preferably a number in the range of 18 to 45, more preferably a number in the range of 20 to 45. z is a number preferably in the range 0 to 25. Particularly preferably, x is a number in the range 20 to 40, y is a number in the range 20 to 40 and z is zero. When emulsifying the anti-foaming agent compound in the present invention, by selecting the aforementioned range for x, y and x+y (z may be 0), and emulsifying with a polyorganosiloxane polymer crosslinked product having a polyoxyalkylene group having a polysiloxane structure with a specific range of chain lengths in the aforementioned moiety structure (I), the anti-foaming performance and dilution stability of the anti-foaming agent may be further improved.

The polyorganosiloxane polymer crosslinked product having a polyoxyalkylene group containing the moiety structure (I) and the moiety structure (II) is preferably expressed by the following structural formula:

[Formula 4]

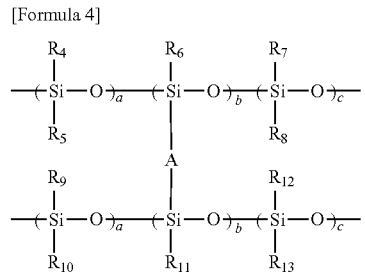

In the formula, A represents moiety structure (I): —$R^1$—$(R^2{}_2SiO)_d$—$R^1$—, and $R^4$~$R^7$ and $R^9$~$R^{12}$ each independently represent a monovalent hydrocarbon group. $R^8$ and $R^{13}$ represent moiety structure (II): —$(CH_2)_e$—O—$(CH_2CH_2O)_x$—$(CH_2CHCH_3O)_y$—$(CH_2CH_2CH_2O)_z$—$R^3$. Preferred ranges of variables a to c representing the number of repetitions are as follows.

a: 1≤a≤1000, preferably 1≤a≤500, most preferably 1≤a≤250
b: 0<b≤30, preferably 0<b≤20, most preferably 0<b≤15
c: 1≤c≤20, preferably 1≤c≤15, most preferably 0≤c≤10

The monovalent hydrocarbon groups of $R^4$ to $R^7$ and $R^9$ to $R^{12}$ represent one or more unsubstituted or substituted monovalent hydrocarbon groups having 1 to 18 carbon atoms, especially 1 to 15 carbon atoms, which may be the same or different. Specific examples of monovalent hydrocarbon groups for $R^2$ include a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, hexadecyl group, octadecyl group, and other alkyl groups, a cyclohexyl group and other cycloalkyl groups, a vinyl group, allyl group, and other alkenyl groups, a phenyl group, tolyl group, and other aryl groups, a styryl group, α-methylstyryl groups, and other aralkyl groups, or a chloromethyl group, 3-chloropropyl group, 3,3,3-trifluoropropyl group, cyanoethyl group, 3-aminopropyl group, N—(β-aminoethyl)-γ-aminopropyl group, and the like in which a part or all of the hydrogen atoms bonded to the carbon atoms of these groups are substituted with a halogen atom, cyano group, amino group, hydroxyl group, or the like. An alkyl group is preferred, and a methyl group is particularly preferred.

The polyorganosiloxane polymer crosslinked product having the polyoxyalkylene group containing moiety structure (I) and moiety structure (II) is preferably expressed by the following structural formula:

[Formula 5]

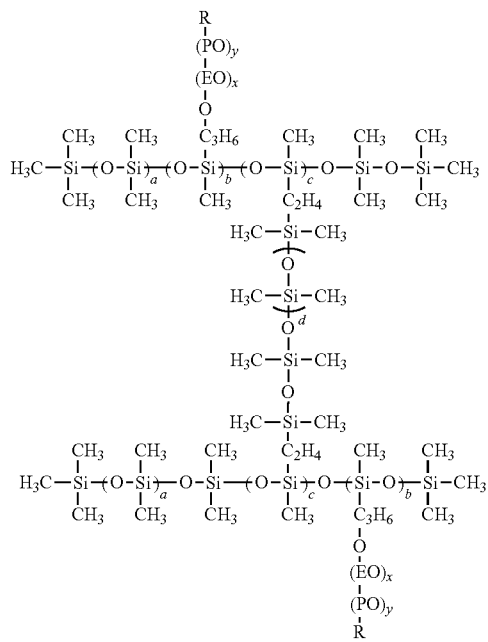

(where, a is a number from 10 to 200,
b+c is a number in the range of 2 to 50,
b and c are each a number of 1 or more,
EO and PO represent the same groups as described above,
R represents a hydrogen atom, an alkyl group, an aryl group or an acyl group, and
d, x and y are the same numbers as defined in the moiety structures (1) and (11)).

In the structural formula described above, R represents the same groups as $R^3$ in moiety structure (II), and represents a hydrogen atom, an alkyl group, an aryl group, or an acyl group. The alkyl group may be an unsubstituted or substituted alkyl group having 1 to 18 carbon atoms, especially 1 to 15 carbon atoms, and examples include: a methyl group, ethyl group, propyl group, isopropyl group, butyl group, isobutyl group, pentyl group, hexyl group, heptyl group, octyl group, nonyl group, decyl group, dodecyl group, tridecyl group, tetradecyl group, hexadecyl group, and octadecyl group. The aryl group may be an aryl group having 6 to 20 carbon atoms and examples include: a phenyl group and tolyl group. The acyl group may be an acyl group having 2 to 12 carbon atoms and examples include: an acetyl group, propionyl group, and benzoyl group.

The polyorganosiloxane polymer crosslinked product having a polyoxyalkylene group is obtained by the following reaction.

Addition reaction of the following components (a) and (b):
Component (a): Polyorganosiloxane having two or more Si—H groups in the side chain in one molecule
Component (b): Polyorganosiloxane capped with vinyl or alkenyl groups at both terminals Specifically, the polyorganosiloxane polymer crosslinked product having a polyoxyalkylene group can be obtained by:
(i) a step of hydrosilylation reacting a polyorganosiloxane having two or more Si—H groups in a sidechain per one molecule and a polyorganosiloxane capped at both terminals with a vinyl group or alkenyl group in isopropyl alcohol or toluene using a platinum catalyst to obtain crosslinked siloxane;
(ii) a step of reacting the product obtained in step (i) with an allyl polyether in isopropyl alcohol or toluene using a platinum catalyst to obtain a crosslinked polyether-modified silicone; and
(iii) a step of heating to 100 to 150° C. under reduced pressure to remove the reaction solvent. Note that the steps (i) and (ii) can be performed at a temperature of 80 to 100° C.

With the polyorganosiloxane polymer crosslinked product having a polyoxyalkylene group, component (a) and component (b) described above react and an addition reaction of the Si—H group and vinyl group or alkenyl group thereof forms a three dimensional crosslinked structure, and flowability is achieved. Here, the three-dimensional crosslinked structure represents a structure in which two or more polyorganosiloxane molecules are bonded via two or more branched structures.

The method for obtaining a specific siloxane crosslinked product having the characteristics described above is not limited, and may be a method of obtaining a crosslinked product of a polyorganosiloxane polymer and adding a polyoxyalkylene group, or a method of obtaining a straight chain polyorganosiloxane to which a polyoxyalkylene group is added.

The polyorganosiloxane polymer crosslinked product having polyoxyalkylene groups preferably has a viscosity of 100 to 100,000 mPa·s at 25° C.

In a self-emulsifying anti-foaming agent, the polyorganosiloxane polymer crosslinked product having a polyoxyalkylene group described above may be used alone or in a mixture of two or more, and is preferably from 0 to 95% by mass, more preferably from 0 to 70% by mass, of the total amount of the self-emulsifying anti-foaming agent. If the content is too small, the main purpose of the self-emulsifying anti-foaming agent, which is to improve the dispersibility of the silicone based anti-foaming agent oil compound, may not be satisfied and if the content is too high, the anti-foaming performance may be inferior as an anti-foaming agent. When blended, an effective amount can be used, but is preferably blended in an amount of 20% by mass or more.

In addition, self-emulsifying anti-foaming agents that may be used include: polyoxyalkylene polymers expressed by
HO—[PO]$_{35}$—H,
HO—[PO]$_{70}$—H,
HO-[EO]$_4$—[PO]$_{30}$—H,
HO-[EO]$_{25}$—[PO]$_{35}$—H,
HO—[PO]$_{30}$—H,
$CH_2$=$CHCH_2$O-[EO]$_{32}$—[PO]$_8$—H,
$CH_2$=$CHCH_2$O-[EO]$_{22}$—[PO]$_{22}$—$C_4H_9$,
$CH_2$=$CHCH_2$O-[EO]$_{10}$—$CH_3$ (where, in each formula above EO represents an ethyleneoxy unit expressed by $C_2H_4O$, preferably an ethyleneoxy unit expressed by $CH_2CH_2O$. PO represents a propyleneoxy unit expressed by $C_3H_6O$, and may be a propyleneoxy unit preferably expressed by either $CH_2CH(CH_3)O$ or $CH_2CH_2CH_2O\cdot$);

or sorbitan fatty acid ester, glycerol fatty acid ester, polyglycerol fatty acid ester, propylene glycol fatty acid ester, sucrose fatty acid ester, polyoxyethylene alkyl ether, polyoxyethylene oxypropylene alkyl ether, polyoxyethylene fatty acid ester, polyoxyethylene sorbitan fatty acid ester, polyoxyethylene glycerin fatty acid ester, polyoxyethylene propylene glycol fatty acid ester, polyoxyethylene castor oil, polyoxyethylene hydrogenated castor oil, and other nonionic surfactants.

In the self-emulsifying anti-foaming agent, the polyoxyalkylene polymer described above is blended in order to enhance the dispersibility of the silicone based anti-foaming agent oil compound, and may be used alone or as a mixture of two or more. However, the content thereof is preferably 0 to 95% by mass, more preferably 0 to 70% by mass, based on the total self-emulsifying anti-foaming agent composition. If the content is too high, the anti-foaming performance of the anti-foaming agent composition may deteriorate. When blended, an effective amount can be used, but is preferably blended in an amount of 20% by mass or more.

In addition, in the self-emulsifying anti-foaming agent, the nonionic surfactant describe above is blended in order to enhance the dispersibility of the silicone based anti-foaming agent oil compound, and may be used alone or as a mixture of two or more. However, the content thereof is preferably 0 to 95% by mass, more preferably 0 to 70% by mass, based on the total self-emulsifying anti-foaming agent. If the content is too high, the anti-foaming performance of the anti-foaming agent may deteriorate. When blended, an effective amount can be used, but is preferably blended in an amount of 20% by mass or more.

In addition, when a self-emulsifying anti-foaming agent is used, the content of the silicone based anti-foaming agent oil compound is preferably 5 to 80% by mass of the total self-emulsifying anti-foaming agent composition, more preferably 10 to 70% by mass and even more preferably 20 to 60% by mass. If the content of the silicone based anti-foaming agent oil compound is too small, the anti-foaming performance as an anti-foaming agent may be inferior, and if the content is too high, increasing the dispersibility of the silicone based anti-foaming agent oil compound, which is the main purpose of the self-emulsifying anti-foaming agent, may not be satisfied.

Furthermore, when an emulsion-type anti-foaming agent is used, a known method can be used. Here, a polyorganosiloxane polymer crosslinked product having a polyoxyalkylene group described above, a polyoxyalkylene polymer, nonionic surfactant, or the like can be used as the emulsifier for emulsifying the silicone based anti-foaming agent oil compound.

In an emulsion-type anti-foaming agent, the polyorganosiloxane polymer crosslinked product having a polyoxyalkylene group described above may be used alone or in a mixture of two or more, and is preferably from 0 to 30% by mass, more preferably from 1 to 20% by mass, of the total amount of the emulsion-type anti-foaming agent. If the content exceeds 30% by mass, the anti-foaming performance of the anti-foaming agent may deteriorate.

In addition, with the emulsion-type anti-foaming agent, the polyoxyalkylene polymer described above serves as an emulsification aid, and may be used alone or in a mixture of two or more and the content thereof is preferably 0 to 40% by mass, more preferably 0 to 20% by mass of the total emulsion-type anti-foaming agent. If the content exceeds 40% by mass, the emulsifying properties of the composition may deteriorate. In addition, an effective amount can be used when blended but 5% by mass or more is preferably blended.

Furthermore, with the emulsion-type anti-foaming agent, the nonionic surfactant is for dispersing the silicone based anti-foaming agent oil compound in water and may be used alone or in a mixture of two or more. However, the content is preferably 0 to 20% by mass, more preferably 1 to 12% by mass, based on the total amount of emulsion-type anti-foaming agent. If the amount exceeds 20% by mass, the viscosity of the anti-foaming agent increases, and workability may deteriorate.

In addition, when used as an emulsion-type anti-foaming agent, the content of the silicone based anti-foaming agent oil compound is preferably 5 to 50% by mass, more preferably 10 to 40% by mass, based on the total amount of the emulsion-type anti-foaming agent. If the content of the silicone based anti-foaming agent oil compound is too low, the anti-foaming performance of the anti-foaming agent may deteriorate, and if the content is too high, the viscosity of the anti-foaming agent may increase, resulting in poor workability.

For an emulsion-type anti-foaming agent, a necessary amount of water must be added to emulsify each of the components such as the silicone based anti-foaming agent oil compound, the polyorganosiloxane polymer crosslinked product having a polyoxyalkylene group, the polyoxyalkylene polymer, and the nonionic surfactant. The amount is the balance relative to the total of the content ratio of each of the components and is preferably 50 to 2,000 parts by mass, more preferably 80 to 400 parts by mass relative to a combined 100 parts by mass for all of the components.

Note that the emulsion-type anti-foaming agent can be prepared by mixing prescribed amounts of each component other than water, and stirring and emulsifying using a known method such as a homomixer, homogenizer, colloid mill, or other mixer/disperser while heating as necessary is feasible. However, in particular, uniformly mixing and dispersing prescribed amounts of each component other than water, adding a part of the water, then stirring and emulsifying, then adding the remaining water, and then stirring and mixing until uniform is preferable.

In addition, a small amount of preservative and disinfectant may optionally be added to the emulsion-type anti-foaming agent for the purpose of preservation. Specific examples of the preservatives/bactericides include sodium hypochlorite, sorbic acid, potassium sorbate, salicylic acid, sodium salicylate, benzoic acid, sodium benzoate, parabens, isothiazoline compounds, and the like. The addition amount is preferably 0 to 0.5% by mass, and more preferably 0.005 to 0.5% by mass of the total emulsion-type anti-foaming agent.

In addition, a small amount of thickening agent may optionally be added to the emulsion-type anti-foaming agent for the purpose of thickening. Specific examples of this thickening agent include polyacrylic acid, sodium polyacrylate, acrylic acid/methacrylic acid copolymer, sodium carboxymethylcellulose, methylcellulose, hydroxypropyl methylcellulose, hydroxyethyl methylcellulose, xanthan gum, guar gum, and the like. The addition amount is preferably 0 to 1.0% by mass, more preferably 0.01 to 0.5% by mass of the total emulsion-type anti-foaming agent.

The particle diameter of the emulsion-type anti-foaming agent emulsion is preferably 0.1 to 10 μm, more preferably 0.5 to 8 μm, and even more preferably 0.7 to 6 μm. The particle diameter of the emulsion is defined as the median size (particle diameter corresponding to 50% of the cumulative distribution, based on quantity), which can be measured by a laser diffraction particle diameter distribution analyzer.

The anti-foaming agent of the present invention can favorably be used in: metal working oils such as cutting oil, grinding oil, plastic working oil, heat treatment oil, and electric discharge machining oil; engine oils such as gasoline engine oil, diesel engine oil, and gas engine oil; automotive gear oils such as automatic transmission oil and manual transmission oils; industrial gear oils; turbine oils; bearing oils; and anti-rust oils.

EXAMPLES

The present invention will be described in detail below based on examples, but the present invention is not limited to the following examples.

[Viscosity Measurement]

Using a rotational viscometer (manufactured by SHIBAURA SEMTEK CO., LTD., product name: Vismetron VDA-2), measurement was performed on rotor No. 4 at a rotational speed of 12 rpm.

[Measurement of Average Particle Diameter]

The self-emulsifying compound was dispersed in water and measured using a laser diffraction particle diameter distribution analyzer (LS-230 of Beckman Coulter) and the median diameter (particle diameter corresponding to 50% of the cumulative distribution, 50% particle diameter) was taken to be the average particle diameter.

[Evaluation of Anti-Foaming Performance]

NS Cut S-20 (soluble type water-soluble cutting liquid, 20% active ingredient, manufactured by NS Chemical Co., Ltd.) diluted 4 times with tap water and temperature-controlled to 23° C. was used as a foaming liquid used for antifoaming performance evaluation. The viscosity of the foaming liquid at this time was 3.5 mPa·s. The anti-foaming agent to be evaluated was added at 25 ppm based on solid content.

400 g of the foaming liquid described above was added to a 1000 mL tall beaker, and stirred at 8000 rpm for 10 minutes using a homomixer (manufactured by Primix Co., Ltd., model HV-M) to cause foaming. Herein, the height of the baffle was 10 cm from the bottom of the homomixer and 11 cm from the bottom of the flask. After stopping the stirring, a foam layer was formed on the upper layer of the liquid portion, and the change in the thickness of the foam layer over time was measured. The time required for the thickness of the foam layer to decrease to 4 mm was defined as t (minutes), and evaluations were made as shown in the table below.

TABLE 1

| Evaluation of anti-foaming performance | |
|---|---|
| Anti-foaming performance | Time |
| ⊚ | t < 3 |
| ○ | 3 ≤ t < 5 |
| Δ | 5 ≤ t < 6 |
| X | t ≥ 6 |

In order to confirm the sustainability of the anti-foaming performance, this operation was repeated four times and the anti-foaming performance was evaluated each time.

Production Example 1

59.1 parts by mass of polydimethylsiloxane terminated with a trimethylsilyl group (viscosity of 5,000 mPa·s at 25° C.), 30.60 parts by mass of polydimethylsiloxane terminated with a silanol group (viscosity of 12,500 mPa·s at 25° C.), and 3.06 parts by mass of polyethyl silicate ("Cilbond 50" produced by Evonik) were placed in a three neck flask with a capacity of 1 L provided with a stirrer, a thermometer, a reflux condenser, and nitrogen gas supply, while stirring, and the temperature was raised to 110° C. A mixture of 1.54 parts by mass of premixed potassium dimethylsilanolate, 5.15 parts by mass of polydimethylsiloxane terminated with a trimethylsilyl group (viscosity of 5,000 mPa·s at 25° C.), and 0.08 parts by mass of ethanol were added at 110° C. and stirring was continued for 30 minutes at 110° C. Next, silica ("Aerosil 200", specific surface area: 200 m²/g, produced by Evonik) was added, and then homogeneously dispersed using a homomixer for 30 minutes while heating at 110° C. A mixture of 0.1 parts by mass of polyether-modified silicone 501 and 0.13 parts by mass of ion exchanged water was added, and after stirring, 5.15 parts by mass of polydimethylsiloxane terminated with a silanol group (viscosity of 40 mPa·s at 25° C.) were added, and the temperature raised to 190° C. 1.25 parts by mass of potassium dimethylsilanolate catalyst was added and allowed to react at 190° C. for 1 hour. The obtained reaction product was neutralized, then 0.02 parts by mass of polyether-modified silicone 501W and 2.19 parts by mass of ion exchanged water were added, to obtain the silicone based anti-foaming agent oil compound. All steps were performed under a nitrogen gas purge. The obtained silicone based anti-foaming agent oil compound had a viscosity of 33,500 mPa·s.

Production Examples 2 to 6

Silicone based anti-foaming agent oil compounds were produced in the same procedure as in Production Example 1, except that the viscosity and amount of the polydimethylsiloxane terminated with a trimethylsilyl group were changed as indicated in Table 1.

TABLE 2A

Amount and viscosity of each component used in Production Examples 1 to 6 (unit of each component: g)

|  | Production Example 1 | Production Example 2 | Production Example 3 |
|---|---|---|---|
| Polydimethylsiloxane terminated with a trimethylsilyl group (viscosity 5000 mPa · s at 25° C.) | 64.25 | — | — |
| Polydimethylsiloxane terminated with a trimethylsilyl group (viscosity 10,000 mPa · s at 25° C.) | — | 64.25 | — |
| Polydimethylsiloxane terminated with a trimethylsilyl group (viscosity 30,000 mPa · s at 25° C.) | — | — | 64.25 |
| Polydimethylsiloxane terminated with a trimethylsilyl group (viscosity 500 mPa · s at 25° C.) | — | — | — |
| Polydimethylsiloxane terminated with a trimethylsilyl group (viscosity 1000 mPa · s at 25° C.) | — | — | — |
| Potassium silanolate catalyst | 1.54 | 1.54 | 1.54 |
| Ethanol | 0.08 | 0.08 | 0.08 |

TABLE 2A-continued

Amount and viscosity of each component used in Production Examples 1 to 6 (unit of each component: g)

|  | Production Example 1 | Production Example 2 | Production Example 3 |
|---|---|---|---|
| Polydimethylsiloxane terminated with a silanol group (viscosity 12,500 mPa · s at 25° C.) | 30.60 | 30.60 | 30.60 |
| Polyethyl silicate ("Cilbond 50" produced by Evonik) | 3.06 | 3.06 | 3.06 |
| Silica ("Aerosil 200" specific surface area 200 m$^2$/g, produced by Evonik) | 3.06 | 3.06 | 3.06 |
| Polyether-modified siloxane 501W produced by DOW | 0.10 | 0.10 | 0.10 |
| Ion exchanged water | 0.13 | 0.13 | 0.13 |
| Polydimethylsiloxane terminated with a silanol group (viscosity 40 mPa · s at 25° C.) | 5.15 | 5.15 | 5.15 |
| Potassium silanolate catalyst | 1.25 | 1.25 | 1.05 |
| Polyether-modified siloxane 501W produced by DOW | 0.02 | 0.02 | 0.02 |
| Ion exchanged water | 2.19 | 2.19 | 1.83 |
| B component/(A component + B component) molar ratio | 0.81 | 0.83 | 0.85 |
| B1 component/(A component + B component) molar ratio | 0.30 | 0.32 | 0.37 |
| Viscosity of compound after reaction (mPa · s) | 33500 | 37100 | 50,000 or more |

TABLE 2B

Usage amount and viscosity of each component in Production Examples 1 to 6 (unit of each component: g)

|  | Production Example 4 | Production Example 5 | Production Example 6 |
|---|---|---|---|
| Polydimethylsiloxane terminated with a trimethylsilyl group (viscosity 5000 mPa · s at 25° C.) | 55.48 | — | — |
| Polydimethylsiloxane terminated with a trimethylsilyl group (viscosity 10,000 mPa · s at 25° C.) | — | — | — |
| Polydimethylsiloxane terminated with a trimethylsilyl group (viscosity 30,000 mPa · s at 25° C.) | — | — | — |
| Polydimethylsiloxane terminated with a trimethylsilyl group (viscosity 500 mPa · s at 25° C.) | — | 64.25 | — |
| Polydimethylsiloxane terminated with a trimethylsilyl group (viscosity 1000 mPa · s at 25° C.) | — | — | 64.25 |
| Potassium silanolate catalyst | 1.54 | 1.54 | 1.54 |
| Ethanol | 0.08 | 0.08 | 0.08 |
| Polydimethylsiloxane terminated with a silanol group (viscosity 12,500 mPa · s at 25° C.) | 38.11 | 30.60 | 30.60 |
| Polyethyl silicate ("Cilbond 50" produced by Evonik) | 3.06 | 3.06 | 3.06 |
| Silica ("Aerosil 200" specific surface area 200 m$^2$/g, manufactured by Evonik) | 3.06 | 3.06 | 3.06 |
| Polyether-modified siloxane 501W produced by DOW | 0.10 | 0.10 | 0.10 |
| Ion exchanged water | 0.13 | 0.13 | 0.13 |
| Polydimethylsiloxane terminated with a silanol group (viscosity 40 mPa · s at 25° C.) | 6.41 | 5.15 | 5.15 |
| Potassium silanolate catalyst | 1.05 | 1.05 | 1.05 |
| Polyether-modified siloxane 501W produced by DOW | 0.02 | 0.02 | 0.02 |
| Ion exchanged water | 1.83 | 1.83 | 1.83 |
| B component/(A component + B component) molar ratio | 0.86 | 0.51 | 0.65 |
| B1 component/(A component + B component) molar ratio | 0.38 | 0.10 | 0.14 |
| Viscosity of compound after reaction (mPa · s) | 50,000 or more | 4650 | 12400 |

[Polyorganosiloxane polymer crosslinked product having polyoxyalkylene groups No. 1 to 4 (BSG #1 to #4)]

The following polyorganosiloxane polymer crosslinked product having polyoxyalkylene groups No. 1 to No. 4 (hereinafter referred to as "BSG #1" to "BSG #4") were used for emulsification of the silicone based anti-foaming agent oil compounds.

[BSG #1]

BSG #1 is a polyorganosiloxane polymer crosslinked product having a polyoxyalkylene (EO/PO=18/18) group expressed by the following average formula.

[Formula 6]

$$\begin{array}{c}
R \\
|\\
(PO)_y \\
|\\
(EO)_x \\
|\\
O \\
|\\
H_3C-Si-(O-Si)_a-O-Si-_b-(O-Si)_c-O-Si-O-Si-CH_3
\end{array}$$

where a=100, b=1.4, c=8.6, d=178.5, x=18, y=18 and R is H.

[BSG #2]

12.59 g of component (a) of straight chain organopolysiloxane expressed by the following chemical formula 1, where j=110, and k=10 and 4.57 g of component (b) of straight chain organopolysiloxane expressed by the following chemical formula 2 with m=290 were heated and mixed at 60° C. After mixing uniformly, 0.002 g of chloroplatinic acid and 0.15 g of isopropyl alcohol were mixed in, allowed to react at 60° C. for 3 hours, and a transparent viscous liquid was obtained. 0.01 g of sodium acetate and 82.84 g of ethylene oxide: 22 mol propylene oxide: 22 mol hydrogen terminated allyl polyether (terminal H) was added to the obtained viscous liquid and reacted for 3 hours while maintaining the temperature at 80 to 90° C. After the reaction, the isopropyl alcohol in the viscous liquid was removed by heating at 80° C. for 1 hour under reduced pressure. A brown viscous liquid was obtained. The brown viscous liquid was a polyorganosiloxane polymer crosslinked product (m=290) with a polyoxyalkylene (EO/PO=22/22) group and was used as BSG #2.

[Formula 7]

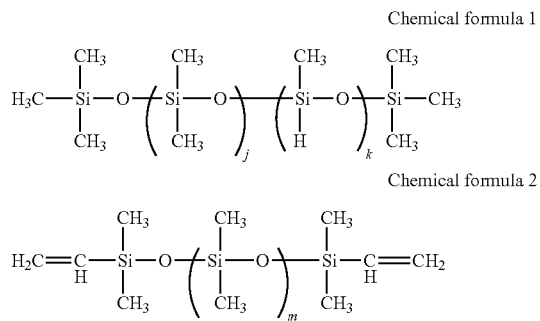

Chemical formula 1

Chemical formula 2

[BSG #3]

12.20 g of component (a) of straight chain organopolysiloxane expressed by formula 1 described above with j=110, k=10, 7.51 g of component (b) of straight chain organopolysiloxane expressed by formula 2 described above with m=493, and 20.00 g of toluene were heated and mixed at 60° C. After mixing uniformly, 0.002 g of chloroplatinic acid and 0.15 g of isopropyl alcohol were mixed in, allowed to react at 60° C. for 3 hours, and a transparent viscous liquid was obtained. 0.01 g of sodium acetate and 80.29 g of ethylene oxide: 22 mol propylene oxide: 22 mol hydrogen terminated allyl polyether was added to the obtained viscous liquid and reacted for 3 hours while maintaining the temperature at 80 to 90° C. After the reaction, isopropyl alcohol and toluene in the viscous liquid were removed by heating at 100° C. for 3 hours under reduced pressure. A brown viscous liquid was obtained. The brown viscous liquid was a polyorganosiloxane polymer crosslinked product (m=493) with a polyoxyalkylene (EO/PO=22/22) group and was used as BSG #3.

[BSG #4]

11.71 g of component (a) of straight chain organopolysiloxane expressed by formula 1 described above with j=110, k=10, 11.19 g of component (b) of straight chain organopolysiloxane expressed by formula 2 described above with m=766, and 12.82 g of toluene were heated and mixed at 60° C. After mixing uniformly, 0.002 g of chloroplatinic acid and 0.15 g of isopropyl alcohol were mixed in, allowed to react at 60° C. for 3 hours, and a transparent viscous liquid was obtained. 0.01 g of sodium acetate and 77.10 g of ethylene oxide: 22 mol propylene oxide: 22 mol hydrogen terminated allyl polyether was added to the obtained viscous liquid and reacted for 3 hours while maintaining the temperature at 80 to 90° C. After the reaction, isopropyl alcohol and toluene in the viscous liquid were removed by heating at 100° C. for 3 hours under reduced pressure. A brown viscous liquid was obtained. The brown viscous liquid was a polyorganosiloxane polymer crosslinked product (m=766) with polyoxyalkylene (EO/PO=22/22) groups and was used as BSG #4.

Example 1

After mixing 45 parts by mass of BSG #1 and 25 parts by mass of EOPOEO copolymer (ADEKA Pluronic (registered trademark) L-31); 30 parts by mass of the silicone based anti-foaming agent oil compound produced in Production Example 1 was added and a homomixer was used to obtain a self-emulsifying anti-foaming agent. The average particle diameter of the anti-foaming agent emulsion thus obtained was 2.1 μm.

Examples 2 to 4 and Comparative Examples 1 and 2

An anti-foaming agent was prepared using the same procedure as in Example 1, except that the silicone based anti-foaming agent oil compound was changed as indicated in Table 2.

TABLE 3 anti-foaming agents of Examples 1 to 4 and Comparative Examples 1 and 2, as well as particle diameter and anti-foaming retention (unit of each component: g)

|  | Example 1 | Example 2 | Example 3 | Example 4 | Comparative Example 1 | Comparative Example 2 |
|---|---|---|---|---|---|---|
| Compound of Production Example 1 | 30 | — | — | — | — | — |
| Compound of Production Example 2 | — | 30 | — | — | — | — |
| Compound of Production Example 3 | — | — | 30 | — | — | — |
| Compound of Production Example 4 | — | — | — | 30 | — | — |
| Compound of Production Example 5 | — | — | — | — | 30 | — |
| Compound of Production Example 6 | — | — | — | — | — | 30 |
| BSG#1 | 45 | 45 | 45 | 45 | 45 | 45 |
| EOPOEO Copolymer (ADEKA Pluronic L-31) | 25 | 25 | 25 | 25 | 25 | 25 |
| Emulsion particle diameter after emulsification (μm) | 2.1 | 1.9 | 2.5 | 5.1 | 1.9 | 3.3 |
| Anti-foaming retention 1 time | ◉ | ◉ | ◉ | ◉ | Δ | ○ |

TABLE 3-continued anti-foaming agents of Examples 1 to 4 and Comparative Examples 1 and 2, as well as particle diameter and anti-foaming retention (unit of each component: g)

|  | Example 1 | Example 2 | Example 3 | Example 4 | Comparative Example 1 | Comparative Example 2 |
|---|---|---|---|---|---|---|
| Anti-foaming retention 2 times | ○ | ◎ | ◎ | ◎ | X | Δ |
| Anti-foaming retention 3 times | ○ | ○ | ○ | ○ | X | X |
| Anti-foaming retention 4 times | ○ | ○ | ○ | ○ | X | X |

Examples 5 to 7

An anti-foaming agent was prepared using the same procedure as in Example 1, except that BSG #1 was changed as shown in Table 4.

TABLE 4 anti-foaming agents of Examples 1 to 4 and Comparative Examples 1 and 2, as well as particle diameter and anti-foaming retention (unit of each component: g)

|  | Example 5 | Example 6 | Example 7 |
|---|---|---|---|
| Compound of Production Example 1 | 30 | 30 | 30 |
| BSG#2 | 45 | — | — |
| BSG#3 | — | 45 | — |
| BSG#4 | — | — | 45 |
| EOPOEO Copolymer (ADEKA Pluronic L-31) | 25 | 25 | 25 |
| Emulsion particle diameter after emulsification (μm) | 1.5 | 1.2 | 1.0 |
| Anti-foaming retention 1 time | ◎ | ◎ | ◎ |
| Anti-foaming retention 2 times | ◎ | ◎ | ◎ |
| Anti-foaming retention 3 times | ○ | ○ | ○ |
| Anti-foaming retention 4 times | ○ | ○ | ○ |

As can be seen from Tables 3 and 4 summarizing the results of each example and comparative example, when the silicone based anti-foaming agent oil compound of the present invention is used, the anti-foaming speed is fast from the first time, and anti-foaming properties are superior. In addition, it was found that sufficient anti-foaming properties could be obtained even after repeating the test four times. On the other hand, in the comparative examples in which the polydimethylsiloxane terminated with a trimethylsilyl group had a low viscosity, it was found that a sufficient anti-foaming speed was not obtained, and that the anti-foaming properties were lowered for repeated tests. In addition, as indicated in Table 4, Examples 5 to 7 that used BSG #2 to #4 having long polyoxyalkylene chains composed of a siloxane backbone structure and EO/PO exhibited superior anti-foaming retention as well as superior dilution stability for shear stress. With the present invention, it is anticipated that a combination of the antifoaming oil compound of the present invention and a polyorganosiloxane polymer crosslinked product having a polyoxyalkylene group with an optimized structure will achieve superior antifoaming properties.

The invention claimed is:

1. A silicone based anti-foaming agent oil composition, comprising:
   (A) an essentially hydrophobic organopolysiloxane having a viscosity of 2,500 to 50,000 mPa's at 25° C.: 20 to 80 parts by mass;
   (B) a hydrophobic organopolysiloxane or a cyclic organopolysiloxane containing silanol groups at least at both terminals: 20 to 80 parts by mass;
   (C) a silane or silane condensation product: 1 to 10 parts by mass; and
   (D) a fine powder silica having a specific surface area of 50 m$^2$/g or more: 2 to 10 parts by mass;
   wherein the total amount of (A) and (B) is 100 parts by mass.

2. The silicone based anti-foaming agent oil composition according to claim 1, wherein component (B) includes:
   (B1) a hydrophobic organopolysiloxane containing a silanol group at both terminals and having a viscosity of 1,000 to 10,000,000 mPa·s at 25° C.; and
   (B2) a hydrophobic organopolysiloxane or cyclic siloxane containing silanol groups at both terminals and having a viscosity of 1 to 1,000 mPa's at 25° C.

3. The silicone based anti-foaming agent oil composition according to claim 1, wherein the molar ratio of component (B) relative to the total amount of component (A) and component (B) is 0.7 or more.

4. The silicone based anti-foaming agent oil composition according to claim 2, wherein the molar ratio of component (B1) relative to the total amount of component (A) and component (B1) is 0.2 or more.

5. The silicone based anti-foaming agent oil composition according to claim 1, wherein the viscosity at 25° C. is 10,000 to 1,000,000 mPa·s.

6. A method for manufacturing the silicone based anti-foaming agent oil composition according to claim 1, the method comprising:
   (1) kneading all or part of the components of the silicone based anti-foaming agent oil composition;
   (2) heat-treating the kneaded material obtained in step (1) at 50 to 300° C.;
   (3) adding an alkali catalyst or an acid catalyst to the kneaded product obtained in step (2) and kneading;
   (4) adding, if present, the remaining components of the silicone based anti-foaming agent oil composition to the kneaded material obtained in step (3) and kneading; and
   (5) neutralizing the catalyst in the kneaded product obtained in step (4).

7. An anti-foaming agent containing the silicone based anti-foaming agent oil composition according to claim 1.

8. The anti-foaming agent according to claim 7, which is an emulsion.

9. The anti-foaming agent according to claim 7, wherein the silicone based anti-foaming agent oil composition is emulsified by a polyorganosiloxane polymer crosslinked product containing a polyoxyalkylene group.

10. The anti-foaming agent according to claim 9, wherein
the polyorganosiloxane polymer crosslinked product containing a polyoxyalkylene group includes:

moiety structure (I):

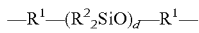
—R$^1$—(R$^2_2$SiO)$_d$—R$^1$— where R$^1$ represents an alkylene group having 2 to 20 carbon atoms bonded to a silicon atom on the polysiloxane chain, R$^2$ represents a monovalent hydrocarbon group, and d is a number in the range of 100 to 1,000, and moiety structure (II):

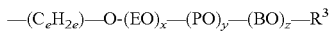
—(C$_e$H$_{2e}$)—O-(EO)$_x$—(PO)$_y$—(BO)$_z$—R$^3$ where

EO represents an ethyleneoxy unit expressed by C$_2$H$_4$O,

PO represents a propyleneoxy unit expressed by C$_3$H$_6$O,

BO represents a butyleneoxy unit expressed by C$_4$H$_8$O, a single bond on the left end is bonded to a silicon atom on the polysiloxane chain, R$^3$ represents a hydrogen atom, an alkyl group, an aryl group or an acyl group, e is a number ranging from 2 to 10, (x+y+z) is a number ranging from 30 to 100, x is a number ranging from 15 to 50, y is a number ranging from 15 to 50, and z is a number ranging from 0 to 50.

11. The anti-foaming agent according to claim 10, wherein
the polyorganosiloxane polymer crosslinked product having the polyoxyalkylene group is expressed by the following structural formula:

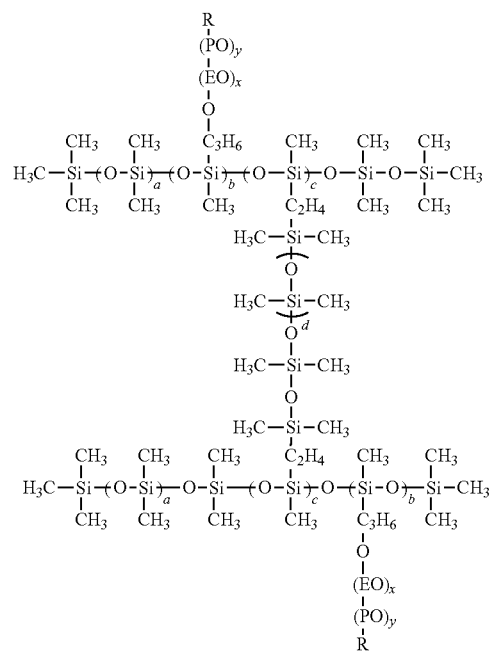

where
a is a number from 10 to 200,
(b+c) is a number in the range of 2 to 50,
b and c are each a number of 1 or more,
EO and PO are as described above,
R represents a hydrogen atom, an alkyl group, an aryl group or an acyl group, and
d, x and y are as defined in moiety structures (I) and (II).

12. The anti-foaming agent according to claim 8, wherein the emulsion particle diameter is 0.1 to 10 μm.

13. The anti-foaming agent according to claim 7, suitable for use as or in a metalworking oil.

* * * * *